United States Patent
Wintermann

(10) Patent No.: US 9,382,396 B2
(45) Date of Patent: Jul. 5, 2016

(54) CAVITY BLOCKS

(75) Inventor: Peter Wintermann, Vechta (DE)

(73) Assignee: BASF SE, Ludwigshafen (DE)

( * ) Notice: Subject to any disclaimer, the term of this patent is extended or adjusted under 35 U.S.C. 154(b) by 648 days.

(21) Appl. No.: 13/595,462

(22) Filed: Aug. 27, 2012

(65) Prior Publication Data

US 2013/0052383 A1 Feb. 28, 2013

Related U.S. Application Data

(60) Provisional application No. 61/528,798, filed on Aug. 30, 2011.

(51) Int. Cl.
*C08J 9/04* (2006.01)
*E04C 1/41* (2006.01)

(52) U.S. Cl.
CPC ... *C08J 9/04* (2013.01); *E04C 1/41* (2013.01); *C08J 2203/18* (2013.01); *C08J 2205/10* (2013.01); *Y10T 428/1376* (2015.01)

(58) Field of Classification Search
CPC .......................................................... C08J 9/04
See application file for complete search history.

(56) References Cited

U.S. PATENT DOCUMENTS

2007/0259981 A1 11/2007 Eling et al.
2012/0264841 A1* 10/2012 Tomovic et al. .............. 521/128

FOREIGN PATENT DOCUMENTS

DE 10 2004 051 102 A1 4/2006

* cited by examiner

*Primary Examiner* — Larry Thrower
(74) *Attorney, Agent, or Firm* — Oblon, McClelland, Maier & Neustadt, L.L.P.

(57) ABSTRACT

Cavity blocks contain a rigid polyurethane foam having a density in the range of 30-70 g/L in at least one chamber, the rigid polyurethane foam being obtained by reacting at least one polyisocyanate a) with at least one compound having at least two isocyanate-reactive hydrogen atoms b) in the presence of at least one catalyst d) and using at least one blowing agent c), comprising at least one blowing agent ci), which only develops its blowing effect at the time of the reaction of a) with b), and at least one blowing agent cii), which has a boiling point which is below the temperature at which said components a) and b) are mixed, wherein the pressure buildup during the foaming reaction of the polyurethane remains below 20 kPa, and the invention also relates to the corresponding process for producing the cavity blocks.

18 Claims, No Drawings

CAVITY BLOCKS

The invention relates to cavity blocks comprising thermal insulation and also a process for production thereof.

It is known to improve the thermal insulation of buildings by using cavity blocks containing an insulant in their cavities. Foamed plastics are an example of useful insulants.

DE 102006054457 describes a process for subsequent insulation of masonry wherein a polyurethane assembly foam is introduced into the cavities in the masonry. Such a procedure, however, is inconvenient and time consuming. It is more advantageous to insulate the cavities in cavity blocks before they are used in building construction.

DE 34 18 0007 describes cavity blocks whose openings are filled with urea-formaldehyde foams under pressure.

DE 27 30 075 describes cavity blocks whose cavities have polyurethane foams introduced thereinto. The cavity blocks are placed on a moving support to introduce the raw materials for the rigid polyurethane foams. The cavity blocks sit on a granular layer said to avoid soiling the moving support.

DE 35 04 104 describes a process for producing cavity blocks having a foam filling. The first step is producing a cavity block, and it is placed on a conveyor belt such that a liquid polymeric mixture comprising blowing agent can be metered into the cavity, where it cures to form a foam. During curing, the openings shall be covered.

EP 190565 A2 discloses the above open cavity blocks into which small amounts of a polymeric mixture comprising blowing agent are metered, which mixture is then foamed and fills the chamber completely.

One problem with insulating cavity blocks using polyurethane foam is the buildup of pressure during foaming. Destruction of intermediate walls may occur in hard-fired bricks in particular. Preventing this requires thick intermediate walls. This raises the weight of bricks/blocks and thermal conductivity increases.

It is an object of the present invention to provide cavity blocks comprising insulation. The cavity blocks should have low thermal conductivity. The cavity blocks should also be of low weight. The cavity blocks should be simple to produce.

We have found that this object is achieved, surprisingly, by cavity blocks insulated using a polyurethane system that only develops a low pressure during foaming.

The invention accordingly provides a cavity block comprising at least one chamber containing a rigid polyurethane foam having a density in the range of 30-70 g obtained by reacting at least one polyisocyanate a) with at least one compound having at least two isocyanate-reactive hydrogen atoms b) in the presence of at least one catalyst d) and using a blowing agent c), comprising at least one blowing agent ci), which only develops its blowing effect at the time of the reaction of a) with b), and at least one blowing agent cii), which has a boiling point which is below the temperature at which said components a) and b) are mixed, wherein the pressure buildup during the foaming reaction of the polyurethane remains below 20 kPa.

The invention further provides a process for producing the cavity blocks of the invention.

Pressure is determined using a Foamat® measuring instrument from Format-Messtechnik GmbH. Measurements are carried out as described in the manufacturer's documentation for 281-type Foamat® with SCHAUM program version 3.x. The Foamat instrument records the pressure buildup for the reacting system during the foaming reaction. The pressure is measured in the bottom region of the sample vessel constructed of an open tube and a plate. The bottom plate is connected to a pressure-measuring sensor.

Pressure buildup during the foaming reaction is preferably below 15 kPa, more preferably below 10 kPa and especially below 5 kPa.

The cavity blocks into whose chambers the polyurethane is introduced are initially produced in a conventional manner. As will be known, they can be produced from concrete, including lightweight concrete, sand-lime brick or clay. Cavity blocks made of clay are also known as hollow bricks or perforated bricks, the term perforated brick being used when the hole fraction is in the range from 15 to 45% and the term hollow brick being used when the hole fraction is above 45%. In what follows, the term hollow brick is used for both embodiments.

Cavity blocks are preferably cuboid, their edge length is preferably 200-500 (length)×200-500 (width)×200-300 (height) mm.

The cavity blocks of the present invention are preferably produced using hollow bricks, since these are particularly sensitive to the pressure in foaming and can be destroyed in the event of an excessive foaming pressure.

They are produced in a conventional manner, typically by shaping the clay mixture, for example by extrusion, and then cutting and firing the moldings thus obtained.

The cavities can be angular or round and preferably they are rectangular. In principle, cavity blocks may comprise just one cavity. To improve the stability of cavity blocks these preferably comprise two or more cavities. The exact number of cavities usually depends on cavity geometry and brick stability.

The number of cavities in cavity blocks is preferably up to 40, more preferably 2-40, even more preferably 3-30 and especially 4-20.

Thereafter, the cavities in the building blocks are filled with the liquid starting compounds for the polyurethane, hereinafter also referred to as polyurethane system. The composition of the polyurethane system will be more particularly described hereinbelow.

This is accomplished by introducing the requisite quantity of the polyurethane system into the cavities using a metering device, for example a mixing head, where the quantity cures to form the foam. Metering is most simply effected manually, but is preferably done automatically, for example using a transportation belt and an automatic metering device as described in DE 35 04 104.

The quantity of polyurethane starting components used is preferably such that the cavities are filled completely. In principle, slight overpacking, preferably up to 10%, is also possible. The foamed material should not protrude beyond the edges of the cavity block.

The rigid polyurethane foams used for filling the cavities are preferably of the closed-cell type. By closed-cell type is meant that the proportion of closed cells in the foam, when determined to DIN ISO 4590, is at least 90%.

As mentioned, the reaction takes place in the presence of a blowing agent c) which is a mixture of a component ci) and a component cii).

The blowing agent ci) may be a chemical blowing agent. Water is preferably used as chemical blowing agent ci). In this embodiment, water is preferably used in an amount of above 0% by weight and more preferably above 0.5% by weight and up to 3% by weight, based on the component b).

The blowing agent ci) may also be a physical blowing agent, more particularly an optionally halogenated hydrocarbon. When a physical blowing agent is used as blowing agent ci), it is preferably selected from the group comprising hydrocarbons and halogenated hydrocarbons. Preference is given to saturated hydrocarbons, hereinafter also referred to as alkanes, and olefinically unsaturated hydrocarbons, hereinafter also referred to as alkenes.

For safety reasons, it is preferable to use halogenated alkanes and for ecological reasons it is preferable to use halogenated alkanes that still comprise at least one hydrogen atom in the molecule.

Blowing agents of this type are common knowledge and have been extensively described. Examples thereof are 1,1,1,3,3-pentafluoropropane (HFC-245fa), $HCl_2C$—$CF_2$ (HFCKW 123), $Cl_2FC$—$CH_3$ (HFCKW 141b).

It is further possible to use mixtures of 365fa and HFC 227 (1,1,1,3,3-pentafluorobutane and 1,1,1,2,3,3,3-heptafluoropropane). These mixtures are available for example from Solvay as Solkane® 365/227. The mixing ratios here of 365 to 227 are preferably in the range between 87:13 and 93:7.

The physical blowing agents ci) are preferably used in an amount of above 0% to 20% by weight, based on the component b).

One embodiment of the process according to the present invention utilizes a mixture of at least one physical and at least one chemical blowing agent as blowing agent ci). Typically, the mixture concerned here is of water and at least one halogenated hydrocarbon. In this embodiment it is again preferable to use water in an amount of above 0% by weight and more preferably above 0.5% by weight and up to 3% by weight. In this embodiment the physical blowing agents are again preferably used in an amount of above 0% to 20% by weight, based on the component b).

The exact amount of blowing agents depends on the target density of the foams.

The blowing agent cii) is typically a mixture of physical blowing agents. Halogenated hydrocarbons are preferably concerned.

The blowing agent cii2) preferably has a boiling point of below 20° C. and more preferably below 0° C.

More particularly, the blowing agent cii2) is selected from the group comprising 1,1,1,2,3,3,3-heptafluoropropane, 1,1,1,2-tetrafluoroethane (134a), the hydrofluoroolefin HFO-1234ze or mixtures thereof, of which 1,1,1,2,3,3,3-heptafluoropropane and 1,1,1,2-tetrafluoroethane have the greatest industrial importance.

The blowing agent cii) is admixed to the reaction mixture—preferably immediately before or preferably during the mixing of components a) and b). Preferably it is added from a separate tank of at least one of the reaction components a) or b), preferably a), into the pipework of the foaming apparatus, preferably into the feed line to the mixing head, for example via a static mixer. It is also possible to dose the blowing agent cii) directly into the mixing head. The blowing agent cii) is preferably used at least in an amount of above 0% and more preferably above 0.5% by weight. The maximum amount is 12% by weight and preferably 10% by weight, both based on component b).

The blowing agent ci) is present in at least one of components a) and b) before the mixing of said components a) and b). Usually, the blowing agent ci) is added to component b). This is typically done at the blending stage of the polyurethane systems. Owing to the boiling temperatures of the blowing agents ci) being above room temperature, the mixtures formed from the components and the blowing agents are stable in storage.

The liquid reaction mixture is introduced into the cavities by the pour foam technique as known to be practiced for applications in building construction.

The blowing agent cii) causes the reaction mixture emerging from the mixing device to slightly froth up. As a result, the viscosity of the emerging mixture increases and the pressure buildup during the foaming procedure is reduced with respect to standard rigid polyurethane foam systems.

The frothing effect is sufficient to result in the formation of a foam which fills out a large proportion of the cavities without any significant pressure buildup taking place. The blowing agent ci) adjusts the foam to the target density. Again no significant pressure buildup takes place here. Curing takes place by the reaction of components a) and b).

Components used for producing the rigid polyurethane foam will now be more particularly described:

The organic polyisocyanate a) may be any known organic di- and polyisocyanate and preferably is an aromatic polyfunctional isocyanate.

Specific examples are 2,4- and 2,6-tolylene diisocyanate (TDI) and the corresponding isomeric mixtures, 4,4'-, 2,4'- and 2,2'-diphenylmethane diisocyanate (MDI) and the corresponding isomeric mixtures, mixtures of 4,4'- and 2,4'-diphenylmethane diisocyanates, polyphenyl polymethylene polyisocyanates, mixtures of 4,4'-, 2,4'- and 2,2'-diphenylmethane diisocyanates and polyphenyl polymethylene polyisocyanates (crude MDI) and mixtures of crude MDI and tolylene diisocyanates. The organic di- and polyisocyanates can be used singly or in the form of mixtures.

So-called modified polyfunctional isocyanates, i.e., products obtained by chemical reaction of organic di- and/or polyisocyanates, are frequently also used. Examples are di- and/or polyisocyanates comprising uretdione, carbamate, isocyanurate, carbodiimide, allophanate and/or urethane groups. Modified polyisocyanates may optionally be mixed with one another or with unmodified organic polyisocyanates such as, for example, 2,4'-, 4,4'-diphenylmethane diisocyanate, crude MDI, 2,4- and/or 2,6-tolylene diisocyanate.

In addition, reaction products of polyfunctional isocyanates with polyfunctional polyols, and also their mixtures with other di- and polyisocyanates, can also be used.

One organic polyisocyanate which will prove particularly advantageous is crude MDI, especially with an NCO content of 29% to 33% by weight and a 25° C. viscosity in the range from 150 to 1000 mPas.

The compounds having at least two isocyanate-reactive hydrogen atoms comprise at least two reactive groups, preferably OH groups, and are more particularly polyether alcohols and/or polyester alcohols having OH numbers in the range from 25 to 2000 mg KOH/g.

The polyester alcohols used are usually obtained by condensation of polyfunctional alcohols, preferably diols, having 2 to 12 carbon atoms and preferably 2 to 6 carbon atoms, with polyfunctional carboxylic acids having 2 to 12 carbon atoms, examples being succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyesterols used usually have a functionality of 1.5-4.

Mention may particularly be made of polyether polyols which are obtainable by known methods, for example by alkali-catalyzed or amine-catalyzed addition of ethylene oxide and propylene oxide onto H-functional starter molecules. The starter molecules used are low molecular weight alcohols or amines having a functionality of two or more.

Alkylene oxides used are usually ethylene oxide or propylene oxide, but also tetrahydrofuran, various butylene oxides, styrene oxide, preferably pure 1,2-propylene oxide. The alkylene oxides can be used singly, alternatingly in succession or as mixtures.

The starter substances used are more particularly compounds having at least 2 and preferably from 2 to 8 hydroxyl groups or having at least two primary amino groups in the molecule.

By way of starter substances having at least 2 and preferably from 2 to 8 hydroxyl groups in the molecule it is preferable to use trimethylolpropane, glycerol, pentaerythritol, sugar compounds such as, for example, glucose, sorbitol, mannitol and sucrose, polyhydric phenols, resoles, for example oligomeric condensation products of phenol and formaldehyde and Mannich condensates of phenol, formaldehyde and dialkanolamines and also melamine.

By way of starter substances having at least two primary amino groups in the molecule it is preferable to use aromatic di- and/or polyamines, for example phenylenediamines, and 4,4'-, 2,4'- and 2,2'-diaminodiphenylmethane and also aliphatic di- and polyamines, such as ethylenediamine.

The polyether polyols have a functionality of preferably 2 to 8 and hydroxyl numbers of preferably 25 mg KOH/g to 2000 mg KOH/g and more particularly 150 mg KOH/g to 570 mg KOH/g.

The compounds having at least two isocyanate-reactive hydrogen atoms also include the optionally used chain extenders and crosslinkers. The addition of difunctional chain-extending agents, trifunctional and higher-functional crosslinking agents or else optionally mixtures thereof may prove advantageous for modifying the mechanical properties. Chain-extending and/or crosslinking agents used are preferably alkanolamines and more particularly diols and/or triols having molecular weights below 400 and preferably in the range from 60 to 300.

Chain-extending agents, crosslinking agents or mixtures thereof are advantageously used in an amount of 1% to 20% by weight and preferably 2% to 5% by weight, based on the polyol component.

The polyurethane or polyisocyanurate foams typically comprise flame retardants. It is preferable to use bromine-free flame retardants. Particular preference is given to flame retardants comprising phosphorus atoms, in that trichloroisopropyl phosphate, diethyl ethanephosphonate, triethyl phosphate and/or diphenyl cresyl phosphate are used in particular.

Catalysts used are particularly compounds which greatly speed the reaction of the isocyanate groups with the groups reactive therewith. Examples of such catalysts are basic amines, such as secondary and preferably tertiary aliphatic amines, imidazoles, amidines, alkanolamines, Lewis acids or organometallic compounds, particularly those based on tin. Catalyst systems, consisting of a mixture of various catalysts, can also be used.

Special catalysts are needed if it is necessary to incorporate isocyanurate groups in the rigid foam. The isocyanurate catalysts used are typically metal carboxylates, particularly potassium acetate and its solutions. The catalysts may, as required, be used alone or in any desired mixtures with each or one another.

Useful auxiliaries and/or added substances include the substances known per se for this purpose, examples being surface-active substances, foam stabilizers, cell regulators, fillers, pigments, dyes, antioxidants, hydrolysis control agents, antistats, fungistats and bacteriostats.

Further particulars concerning the starting materials, blowing agents, catalysts and also auxiliary and/or added substances used to carry out the process of the present invention are found for example in Kunststoffhandbuch, volume 7, "Polyurethane" Carl-Hanser-Verlag Munich, 1st edition, 1966, 2nd edition, 1983 and 3rd edition, 1993.

To produce isocyanate-based rigid foams, the polyisocyanates and the compounds having at least two isocyanate-reactive hydrogen atoms are reacted in such amounts that the isocyanate index is in a range between 100 and 220 and preferably between 105 and 180 in the case of the polyurethane foams. Mixing, as already mentioned above, typically takes place in a mixing head.

The cavity blocks of the present invention are mechanically stable and notable for good thermal insulation. Owing to the low pressure buildup, closed-cell rigid polyurethane foam can be used for insulating the cavity blocks without sacrificing the stability of the cavity blocks. This can be used to reduce the thermal conductivity of cavity blocks.

We claim:

1. A process for producing a rigid polyurethane foam, the process comprising:
   reacting at least one polyisocyanate a) with at least one compound comprising at least two isocyanate-reactive hydrogen atoms b) in the presence of at least one catalyst d) and at least one blowing agent c), thereby obtaining the rigid polyurethane foam,
   wherein
   the at least one blowing agent c) comprises:
      a blowing agent ci), which only develops blowing effect when a) reacts with b), and
      a blowing agent cii), which has a boiling point below a temperature at which a) and b) are mixed,
   a pressure buildup during said reacting remains below 20 kPa throughout said process measured in a bottom region of a sample vessel constructed of an open tube and a plate,
   the rigid polyurethane foam has a density of from 30-70 g/L, and
   the rigid polyurethane foam is suitable for a cavity block comprising a chamber.

2. The process according to claim 1, wherein the rigid polyurethane foam is a closed-cell rigid polyurethane foam.

3. The process according to claim 1, wherein the blowing agent ci) is a chemical blowing agent.

4. The process according to claim 1, wherein the blowing agent ci) is a physical blowing agent.

5. The process according to claim 4, wherein the blowing agent ci) is selected from the group consisting of a hydrocarbon and a halogenated hydrocarbon.

6. The process according to claim 4, wherein the blowing agent cii) comprises a halogenated alkane.

7. The process according to claim 1, wherein the blowing agent ci) is a mixture of at least one physical and at least one chemical blowing agent.

8. The process according to claim 1, wherein the blowing agent cii) is a mixture of physical blowing agents.

9. The process according to claim 1, wherein the blowing agent cii) has a boiling point of below 0° C.

10. The process according to claim 1, wherein said pressure buildup during reaction remains below 15 kPa.

11. The process according to claim 1, wherein said pressure buildup during reaction remains below 10 kPa.

12. The process according to claim 1, wherein said pressure buildup during reaction remains below 5 kPa.

13. The process according to claim 1, wherein blowing agent ci) comprises water and is used in an amount of up to 3% by weight, based on component b).

14. The process according to claim 1, wherein blowing agent cii) has a boiling point below 20° C.

15. The process according to claim 1, wherein blowing agent cii) has a boiling point below 0° C.

16. The process according to claim 1, wherein blowing agent cii) is used in amount of 12% by weight or less, based on component b).

17. The process according to claim 1, wherein blowing agent cii) is used in amount of 10% by weight or less, based on component b).

18. The process according to claim 1, wherein said at least one polyisocyanate has a viscosity at 25° C. of 150 to 1,000 mPas.

* * * * *